(12) United States Patent
Kobayashi

(10) Patent No.: US 8,151,058 B2
(45) Date of Patent: Apr. 3, 2012

(54) VECTOR COMPUTER SYSTEM WITH CACHE MEMORY AND OPERATION METHOD THEREOF

(75) Inventor: Koji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 367 days.

(21) Appl. No.: 12/573,400

(22) Filed: Oct. 5, 2009

(65) Prior Publication Data

US 2010/0088473 A1 Apr. 8, 2010

(30) Foreign Application Priority Data

Oct. 3, 2008 (JP) ................................ 2008-258032

(51) Int. Cl.
*G06F 12/00* (2006.01)
*G06F 13/00* (2006.01)
*G06F 13/28* (2006.01)
*G06F 15/00* (2006.01)
*G06F 15/76* (2006.01)
(52) U.S. Cl. .............................. 711/134; 711/143; 712/2
(58) Field of Classification Search .................. 711/118, 711/134, 143; 712/2
See application file for complete search history.

(56) References Cited

U.S. PATENT DOCUMENTS

| | | | | |
|---|---|---|---|---|
| 6,014,728 A * | 1/2000 | Baror | ............................. | 711/133 |
| 6,360,298 B1 * | 3/2002 | Osanai et al. | .................. | 711/133 |
| 7,818,548 B2 * | 10/2010 | Hansen et al. | ................. | 712/222 |
| 2005/0172082 A1 * | 8/2005 | Liu et al. | ........................ | 711/144 |

FOREIGN PATENT DOCUMENTS

| | | |
|---|---|---|
| JP | 58-118083 A | 7/1983 |
| JP | 5-12114 A | 1/1993 |
| JP | 7-152650 A | 6/1995 |
| JP | 7-210463 A | 8/1995 |
| JP | 11-143774 A | 5/1999 |
| JP | 11-312123 A | 11/1999 |
| JP | 3770091 B | 4/2006 |

OTHER PUBLICATIONS

Japanese Office Action for JP2008-258032 dated Jan. 20, 2011.
"K6 vs Pentium II", Monthly ASCII DOS/V Issue, Japan, Kabushkikaisya ASCII, vol. 3, No. 6, Jun. 1, 1997, pp. 141-151.

* cited by examiner

*Primary Examiner* — Jared Rutz
*Assistant Examiner* — Ryan Bertram

(57) ABSTRACT

A vector computer system includes a vector processor configured to issue a vector store instruction which includes a plurality of store requests; a cache memory of a write back system provided between the vector processor and a main memory; and a write allocate determining section configured to generate an allocation control signal which specifies whether the cache memory operates based on a write allocate system or a non-write allocate system. When the vector processor issues the vector store instruction, the write allocate determining section generates the allocation control signal to each of the plurality of store requests based on a write pattern as a pattern of target addresses of the plurality of store requests. The cache memory executes each store request based on one of the write allocate system and the non-write allocate system which is specified based on the allocation control signal.

10 Claims, 14 Drawing Sheets

Fig. 1 RELATED ART

|  | CACHE HIT | CACHE MISS |
|---|---|---|
| WRITE THROUGH | CACHE & MAIN MEMORY | MAIN MEMORY |
| WRITE BACK | CACHE | <NON-WRITE ALLOCATE><br>MAIN MEMORY |
| | | <WRITE ALLOCATE><br>WRITE IN CACHE AFTER<br>TRANSFERRING DATA FROM<br>MAIN MEMORY TO CACHE |

VECTOR COMPUTER SYSTEM WITH CACHE MEMORY AND OPERATION METHOD THEREOF

INCORPORATION BY REFERENCE

This patent application claims a priority on convention based on Japanese Patent Application No. 2008-258032. The disclosure thereof is incorporated herein by reference.

TECHNICAL FIELD

The present invention relates to a control technique for a cache memory of a write back system. More particularly, the present invention relates to a control technique for a cache memory of a write back system for a vector computer system.

BACKGROUND ART

In the field of a computer system, a cache memory technique is widely used to speed up data access by a processor. The cache memory is a memory that is smaller in scale but higher in speed than a main memory, and provided between the processor and the main memory. The cache memory may be hierarchically provided; however, in the following, for simplicity, it is supposed to use one cache memory, and a main memory as a lower layer of hierarchical structure. Even if a plurality of cache memories are hierarchically provided, the same discussion can be applied.

In the cache memory, a part of data having stored in the main memory is stored. More specifically, in the cache memory, data is stored in a unit referred to as a "line (or block)". That is, the cache memory has a plurality of lines, and data for a line size is stored in each of the lines. The line size is a data size per one line, and is 32 bytes, for example. Upon transfer of data having been stored in the main memory to the cache memory, block data for the line size, including the data, is copied from the main memory into a line of the cache memory.

When the processor issues a data access instruction, the cache memory examines whether or not data as an access target is stored in any of the lines. A case where the data as the access target is stored in one of the lines is hereinafter referred to as a "cache hit". On the other hand, a case where the data as the access target is not stored in any of the lines is hereinafter referred to as a "cache miss".

Processing upon data read is as follows: In the case of the cache miss, data is read from the main memory, and then sent to the processor. Also, block data for the line size including the data is copied into a line of the cache memory. On the other hand, in the case of the cache hit, data is read from a corresponding line of the cache memory, and then sent to the processor. That is, no access to the main memory occurs, and the data is read from the higher speed cache memory. Accordingly, a data reading speed is improved.

Regarding processing upon data write, various systems are proposed as illustrated in FIG. 1. The data write system is roughly classified into two systems, i.e., a "write-through system" and a "write-back system". The write-back system is further classified into a "non-write allocate system" and a "write allocate system".

Processing in the write-through system is as follows: In the case of the cache miss, write data is not written in the cache memory, but written only in the main memory. On the other hand, in the case of the cache hit, the write data is written in a corresponding line of the cache memory, and also in the maim memory. Accordingly, in the case of the write-through system, benefit from the cache memory can be gained only upon data read.

Processing in the write-back system is as follows: In the case of the cache hit, write data is not written in the main memory, but written only in a corresponding line of the cache memory. Accordingly, a data writing speed is improved. It should be noted that the latest data that is stored only in the cache memory but is not reflected in the maim memory is written back into the main memory at some time. In the case of the cache miss, processing is different between the non-write allocate system and the write allocate system. In a case of the non-write allocate system, similarly to the write-through system, the write data is not written in the cache memory but written only in the main memory. On the other hand, in the write allocate system, block data for a line size including data as an access target and is read from the main memory. The read block data is stored in some line of the cache memory, and then the write data is written in the line. As described, in the case of the write allocate system, the block data should be transferred from the main memory to the cache memory, and therefore it takes longer time than in the non-write allocate system. However, from the view of locality (having a tendency of continuously accessing successive addresses in the main memory, or repeatedly accessing the same address in a short period of time), it is expected that a probability of the cache hit upon a subsequent request to write data is increased by the write allocate system.

As described, the write allocate system and non-write allocate system respectively have both advantages and disadvantages. To determine which one of the write allocate and non-write allocate systems is employed is important from the view of a system processing efficiency.

According to Japanese Patent Application Publication (JP-a-Heisei 11-312123: first conventional example), a user can assign any one of the write allocate system and a non-write allocate system. Specifically, a cache controller has a register in which information assigning the write allocate system or the non-write allocate system is stored. The user can rewrite content of the register to thereby assign a system.

A cache control unit described in Japanese Patent Application Publication No. (JP-A-Heisei 7-152650: second conventional example) includes a cache memory of a write-back system, a register, a comparator, and a control circuit. When a cache miss occurs upon request to write data, block data including the data is stored in a block address of the register. Upon request to write subsequent data, the comparator compares the block address of the resister and a block address to be currently accessed. The control circuit determines, on the basis of a result of the comparison by the comparator, a processing method upon the cache miss. Specifically, in a case that the comparison result indicates a cache hit, the control circuit performs processing in the write allocate system. On the other hand, in a case that the comparison result indicates a cache miss, the control circuit performs the processing in the non-write allocate system, and also updates the register. That is, upon the request to write data in a block in the memory, the processing is first performed in the non-write allocate system. If a subsequent request to write data is a request to the block, corresponding block data in the memory is copied into the cache memory in the write allocate system for the first. A request to write data in the block is expected to continue, and therefore upon a third or subsequent request to write data, the cache hit is expected.

Japanese Patent Application Publication (JP-A-Heisei 7-210463: third conventional example) discloses a cache memory system including a first cache memory and a second cache memory. Upon a cache miss in the first cache memory for a store (write) instruction, whether or not a block transfer is performed from the second cache memory to the first cache memory according to the write allocate system depends on the situation. To determine whether or not the block transfer (write allocate) is performed, a determining section is provided. The determining section prohibits the block transfer only for an operation of continuously rewriting the whole cache data included in a single line, and for the rest, permits the block transfer. As an example, it is assumed that one line includes four cache data. An instruction buffer register includes an instruction prefetch queue in four stages in series. The determining section receives in parallel data retained by stages of the serial four-stage instruction prefetch queue. Further, the determining section detects whether each of the instructions corresponds to "store (write)" or "load (read)", and also detects whether or not objects to be accessed on the basis of the respective instructions are the same block. Then, in a case of the continuous store instructions that all of cache data in the single line are continuously rewritten, the determining section prohibits the write allocate. For example, in a case of "four continuous store instructions" as illustrated in FIG. 10 of the third conventional example, the determining section prohibits the write allocate. On the other hand, in a case of "1-store-3-load instructions" in which the number of times of storage is only one, the determining section permits the write allocate.

In a cache memory of the write-back system, it is important from the view of system processing efficiency to determine which one of the write allocate system and the non-write allocate system is used.

In the above-described conventional examples, it is necessary to detect continuous instructions to write data in the same block, or an operation of continuously rewriting all of cache data included in a single line. However, in a case of a scalar processor, it is generally difficult to predict an address to be accessed after data write request. Accordingly, to detect the continuous instructions to write data in a same block, or the operation of continuously rewriting all of cache data included in a single line, a complicated configuration and processing as described in the above conventional examples are required.

SUMMARY OF THE INVENTION

One object of the present invention is to dynamically switch between the write allocate system and the non-write allocate system in the cache memory of the write-back system for a vector processor.

In an aspect of the present invention, a vector computer system includes a vector processor configured to issue a vector store instruction which includes a plurality of store requests; a cache memory of a write back system provided between the vector processor and a main memory; and a write allocate determining section configured to generate an allocation control signal which specifies whether the cache memory operates based on a write allocate system or a non-write allocate system. When the vector processor issues the vector store instruction, the write allocate determining section generates the allocation control signal to each of the plurality of store requests based on a write pattern as a pattern of target addresses of the plurality of store requests. The cache memory executes each store request based on one of the write allocate system and the non-write allocate system which is specified based on the allocation control signal.

In another aspect of the present invention, a cache memory of a write back system for a vector processor, includes a write allocate determining section configured to generate an allocation control signal which specifies whether the cache memory operates based on a write allocate system or a non-write allocate system; and a writing controller configured to execute a process of each of a plurality of store requests based on one of the write allocate system and the non-write allocate system which is specified by the allocation control signal. When the vector processor issues the vector store instruction which includes the plurality of store requests, the write allocate determining section generates the allocation control signal to each of the plurality of store requests based on a write pattern as a pattern of target addresses of the plurality of store requests.

In still another aspect of the present invention, an operation method of a vector computer system which comprising a vector processor and a cache memory of a write back system, is achieved by issuing a vector store instruction which contains a plurality of store requests; by specifying one of a write allocate system and a non-write allocate system as a system for each of the plurality of store requests to be executed based on a write pattern as a pattern of target addresses of the plurality of store requests; and by executing the store request based on the specified one of the write allocate system and the non-write allocate system by the cache memory.

According to the present invention, in a cache memory of the write-back system for a vector processor, switching between the write allocate system and the non-write allocate system can be dynamically carried out. This allows system processing efficiency to be improved.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 1 illustrates a data write system in a computer system including a cache memory;

DESCRIPTION OF EXEMPLARY EMBODIMENTS

Hereinafter, a vector computer system of the present invention will be described with reference to the accompanying drawings. The present invention will be described by using cache control in a vector computer system mounted with a vector processor that performs vector calculation.

1. Basic Configuration

Figure 2:
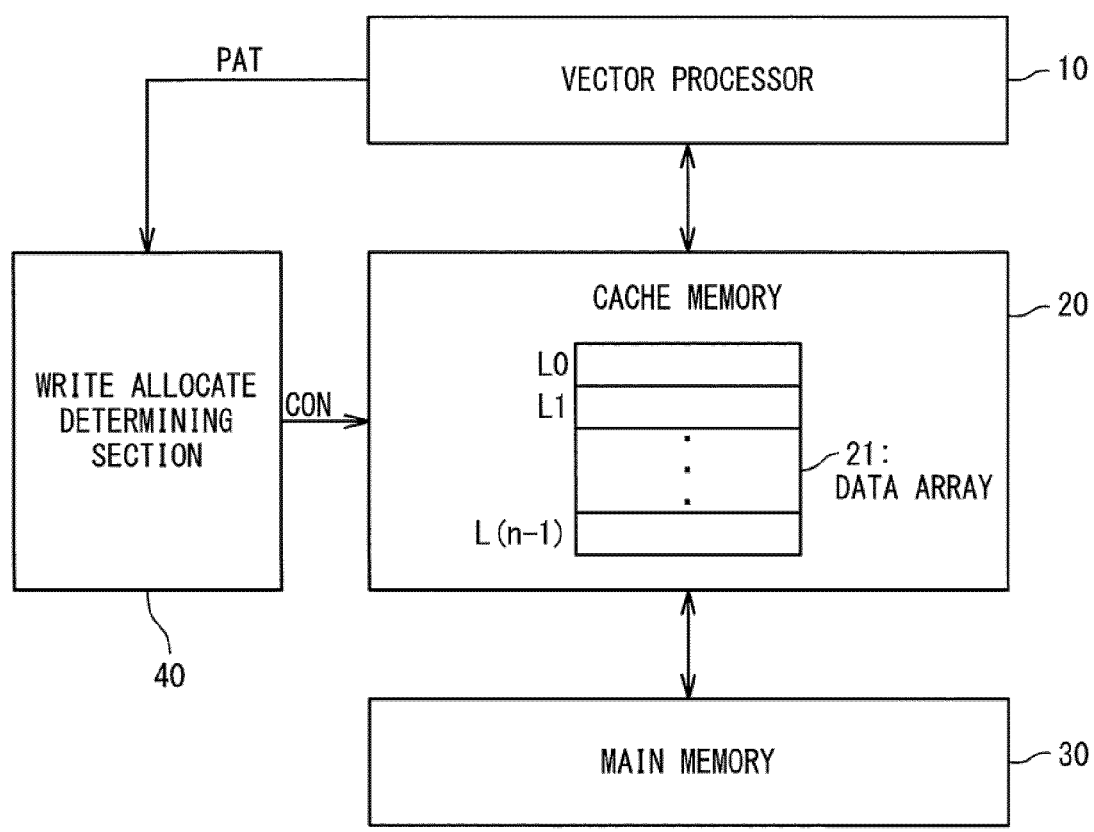
FIG. 2 is a block diagram schematically illustrating a configuration of a vector computer system according to a first exemplary embodiment of the present invention.

FIG. 2 is a block diagram schematically illustrating a configuration of a vector computer system 1 according to a first exemplary embodiment of the present invention. The vector computer system 1 includes a vector processor 10, a cache memory 20, a main memory 30, and a write allocate determining section 40.

The cache memory 20 is for the vector processor 10, and provided between the vector processor 10 and the main memory 30. Typically, the vector processor 10 and the cache memory 20 are configured in one chip. It should be noted that the cache memory may be hierarchically provided; however, for simplicity, it is assumed that only the main memory 30 is present as a memory of a lower hierarchical level than the cache memory 20. Even in a case where a plurality of cache memories are hierarchically provided, the same discussion can be applied. In the present exemplary embodiment, the cache memory 20 executes a data write process in the write-back system, and supports both of the write allocate system and the non-write allocate system. As will be described in detail, switching between the write allocate system and the non-write allocate system can be dynamically carried out.

In the cache memory 20, a part of data stored in the main memory 30 is stored. A storage area for the data is a data array 21. The data array 21 has n lines L0 to L(n−1) (n is an integer equal to or more than 2), and in each of the lines, data for a line size is stored. Upon transfer of data from the main memory 30 to the cache memory 20, block data for the line size including the data is copied from the main memory 30 into a line.

Figure 3:
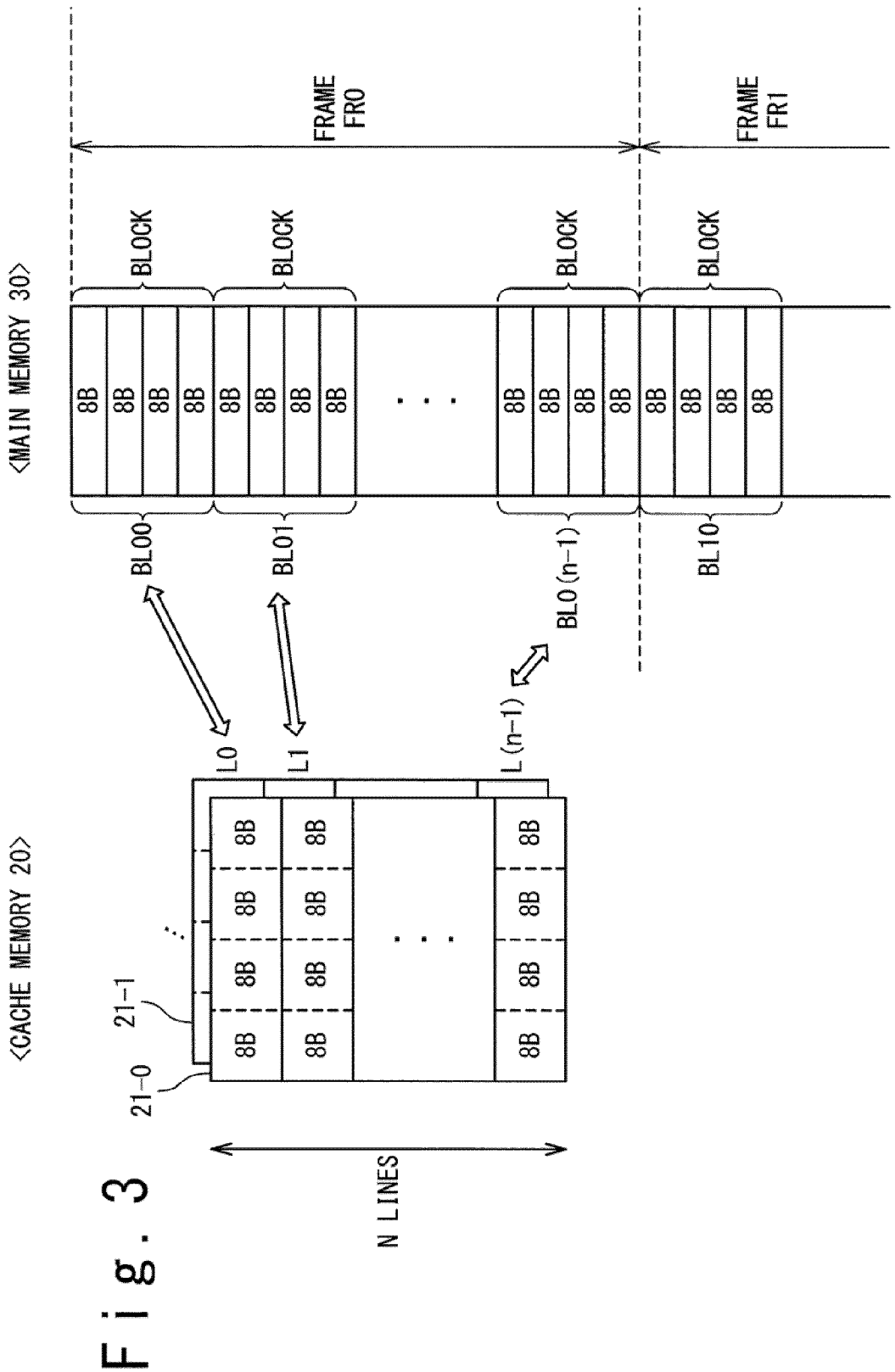
FIG. 3 conceptually illustrates a correspondence relationship between lines of a cache memory and blocks of a main memory.

FIG. 3 illustrates a correspondence relationship between the lines of the cache memory 20 and blocks of the main memory 30. As an example, it is supposed that one data unit is 8 bytes, and a line size is 32 bytes. In this case, a size of one block of the main memory 30 is 32 bytes that is the same as the line size. Also, one line of the cache memory 20 and one block of the main memory 30 are related to each other. More specifically, sequentially from the beginning of the main memory 30, the blocks are related to the lines L0 to L(n−1), respectively. That is, n blocks BL00 to BL0(n−1) from the beginning of the main memory 30 are respectively assigned to the lines L0 to L(n−1). These blocks BL00 to BL0(n−1) constitute one frame FR0. Also, similarly, the subsequent frame FR1 includes n blocks BL10 to BL1(n−1), and the blocks BL10 to BL1(n−1) are respectively assigned to the lines L0 to L(n−1). That is, corresponding blocks belonging to different frames are assigned with the same one line. The main memory 30 includes, for example, m frames FR0 to FR(m−1).

It should be noted that, in a case of the cache memory 20 of a set associative system, a plurality of same data arrays 21 are provided as illustrated in FIG. 3 (the data array is counted in units of "ways"). For example, in a case of 2 ways, two data arrays 21-0 and 21-1 having a same configuration are provided. Also, the respective data arrays 21-0 and 21-1 can store block data in different frames, which are related to the same one line. For example, in the line L0 of the data array 21-0, data in the block BL00 of the frame FR0 can be stored, whereas in the line L0 of the other data array 21-1, data in the block BL10 of the different frame FR1 can be stored.

Upon transfer of data from the main memory 30 to the cache memory 20, 32-byte block data including the data is copied into one line assigned to a corresponding block. At this time, block data originally stored in the one line is written back into the main memory 30 as necessary.

Referring again to FIG. 2, the vector processor 10 is a processor that performs a vector calculation process, and processes vector data including a plurality of elements (data structure is an array). More specifically, the vector processor 10 issues vector instructions such as "vector load", "vector calculation", or "vector store". The vector load is an instruction to read vector data from the main memory 30, and the vector store is an instruction to write vector data in the main memory 30. Differently from a case of a typical scalar processor, the vector load/store instructions are defined by a start address, a data size, an access target data interval (stride, distance), and the like. Such data are set in vector control registers, based on which the load/store instructions for the respective elements are sequentially performed.

Figure 4:
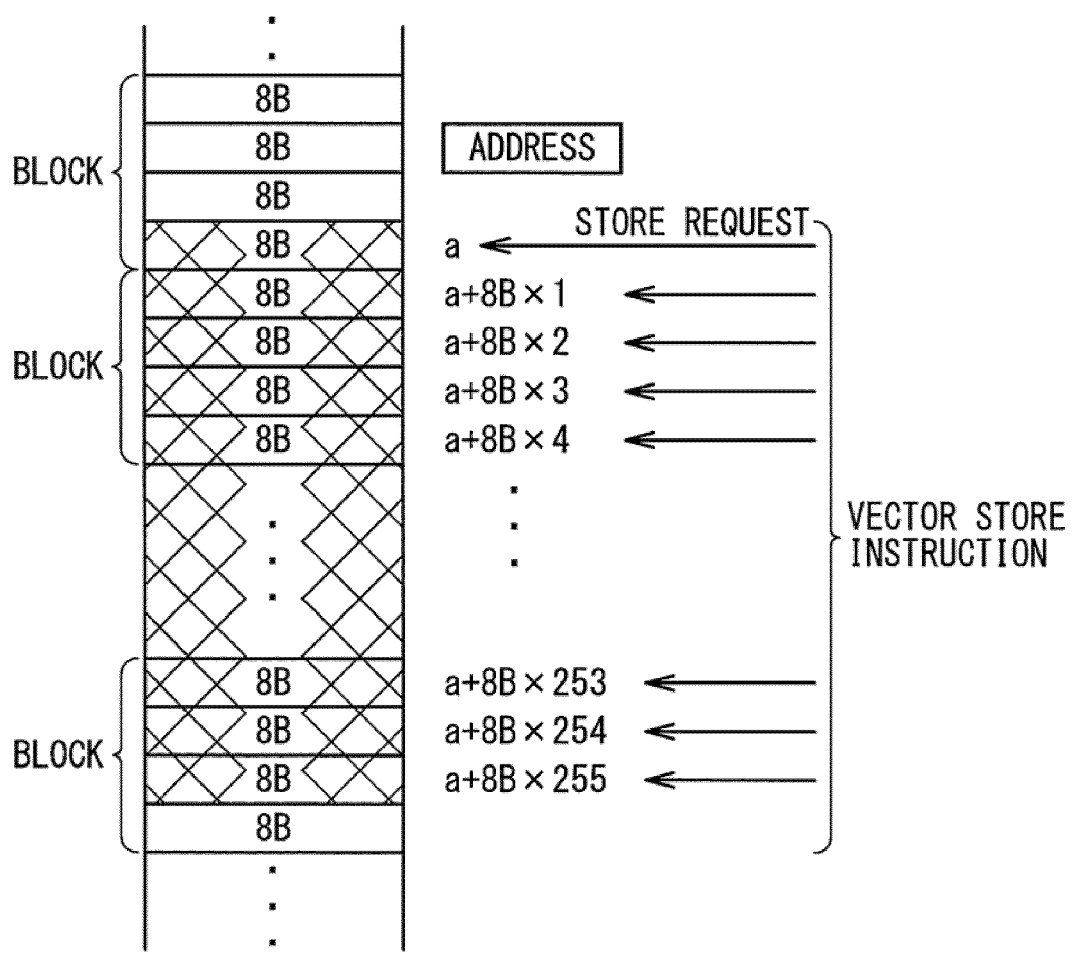
FIG. 4 conceptually illustrates an example of a vector store instruction issued by a vector processor.

FIG. 4 conceptually illustrates an example of the vector store instruction. In FIG. 4, one vector element is 8 bytes in size, and a vector store instruction for vector data including 256 elements is illustrated as the example. More specifically, the vector store instruction includes 256 store requests that respectively correspond to the 256 elements of the vector data and are temporally continuous. A distance is 8 bytes corresponding to the size of one vector element. That is, store request target addresses are continuous, and range from a start address "a" to an end address "a+8B×255". Such start address, end address, and distance are clarified upon issuance of the vector store instruction. That is, upon issuance of the vector store instruction, it is possible to recognize which address the data store instruction is performed on.

It should be noted that, as illustrated in FIG. 4, the start address of the vector store instruction is not limited to a beginning address of a block. Also, the end address of the vector store instruction is not limited to a final address of the block. Accordingly, accesses to all of data may occur in the blocks, whereas accesses to only a part of data may occur in the other blocks. In other words, a pattern of the store request target addresses may include patterns in which only one access to one block occurs, two accesses to one block occur, three accesses to one block occur, and four accesses to one block occur, which is the maximum. Such patterns of the store request target addresses are hereinafter referred to as a "write pattern PAT". It should be noted that the write pattern PAT of a vector store instruction can be recognized upon issuance of the vector store instruction.

The present exemplary embodiment is characterized in that an operation system of the cache memory 20 can be dynamically switched between the write allocate system and the non-write allocate system according to the above-described write pattern PAT associated with the vector store instruction. A component for this purpose is the "write allocate determining section 40" illustrated in FIG. 2. The write allocate determining section 40 may be constructed in the vector processor 10, or alternatively constructed in the cache memory 20.

When the vector processor 10 issues the vector store instruction, the write allocate determining section 40 recognizes the above-described write pattern PAT, and generates an "allocate control signal CON" on the basis of the write pattern PAT. The allocate control signal CON assigns availability of write allocate in the cache memory 20, i.e., whether the cache memory 20 operates in the write allocate system or the non-write allocate system. The allocate control signal CON is generated for each of the store requests of the vector store instruction. The cache memory 20 receives the allocate control signal CON, and processes each of the store requests according to a system assigned by the received allocate control signal CON.

2. Availability of Write Allocate

Figure 5:
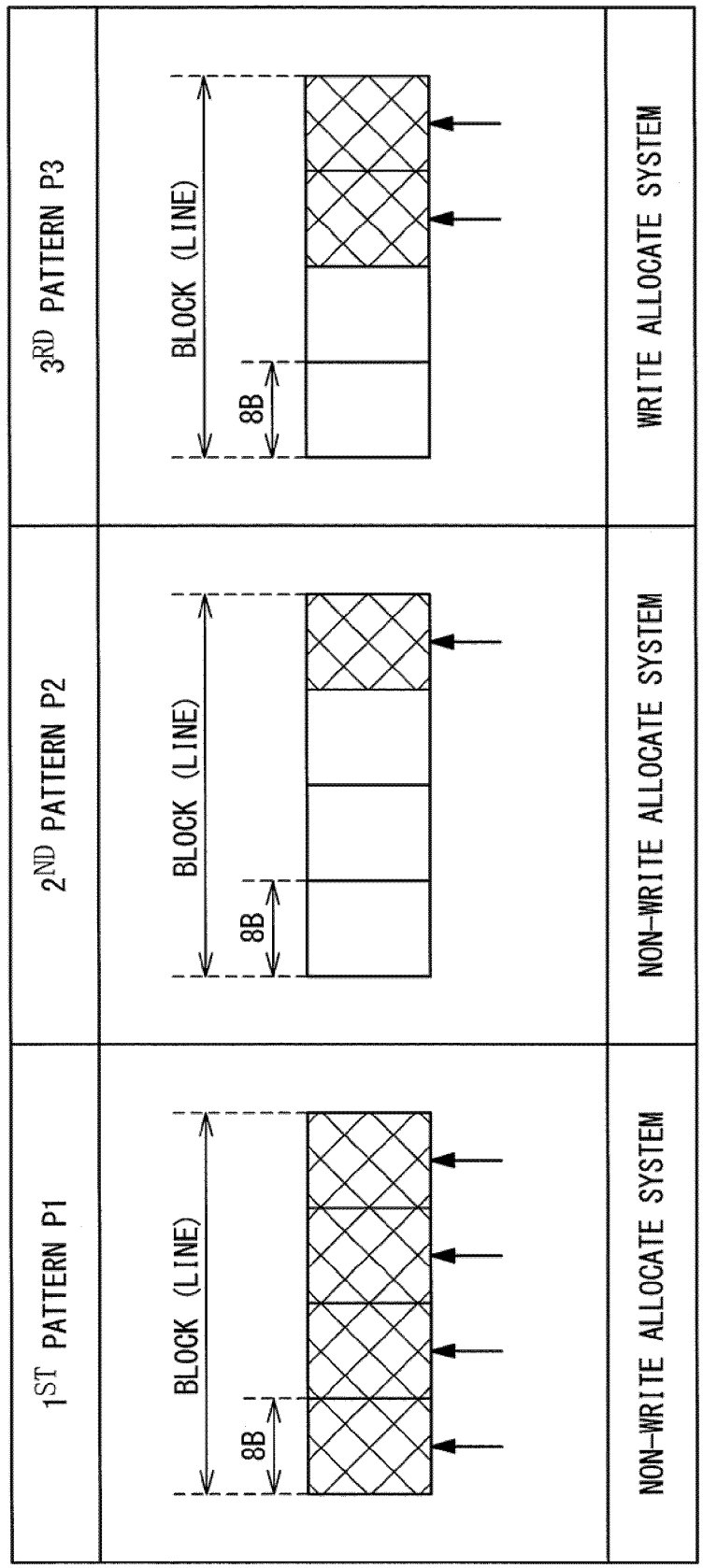
FIG. 5 conceptually illustrates three types of patterns that may be included in a write pattern associated with the vector store instruction.

Next, an example of a criterion for the availability of write allocate will be described. It should be noted that the criterion described below is only an example, and may be appropriately modified depending on a system configuration. FIG. 5 conceptually illustrates three types of patterns P1 to P3 that may be included in the write pattern PAT associated with the vector store instruction. The write pattern PAT includes at least one of the three types of patterns P1 to P3.

The first pattern P1 is a pattern in which store requests to all of data included in one block are generated. In a case of the first pattern P1, 8-byte write to the one block is continuously performed four times, and all of the data are updated. It is assumed that the cache memory 20 operates in the write allocate system. If the cache miss occurs upon the first 8-byte write, 32-byte block data including corresponding 8-byte data is loaded in a corresponding line of the cache memory 20 (line replace). Then, the 8-byte data is written in the line. Upon the subsequent second to fourth 8-byte writes, the cache hit is guaranteed. However, in this case, the 32-byte block data first loaded in the cache memory 20 by the write allocate is entirely rewritten without referring to. That is, the first load of the 32-byte block data results in a meaningless operation. This means that an unnecessary request (load request) is given to the main memory 30 in a lower hierarchical layer. Accordingly, in the case of the first pattern P1, it is not preferable to instruct the write allocate system. In the present exemplary embodiment, in the case of the first pattern P1, the write allocate determining section 40 generates the allocate control signal CON that assigns the "non-write allocate system". As a result, a load on the main memory 30 is reduced. Also, unnecessary line replace is not performed, and therefore a subsequent cache hit rate is expected to be improved.

The second pattern P2 is a pattern in which only one store request to one block is generated. In a case of the second pattern P2, 8-byte write to the one block is performed only once. It is assumed that the cache memory 20 operates in the write allocate system. If the cache miss occurs, 32-byte block data including corresponding 8-byte data is loaded in a corresponding line of the cache memory 20 (line replace). Then, the 8-byte data is written in the line. However, subsequently, no write is performed in the one block, and therefore benefit of the cache hit cannot be gained. That is, the first load of the 32-byte block data does not contribute to speed-up of a vector store operation at all. This means that an unnecessary request (load request) is given to the main memory 30 in the lower hierarchical layer. Accordingly, in the case of the second pattern P2, it is not preferable to instruct the write allocate system. In the present exemplary embodiment, in the case of the second pattern P2, the write allocate determining section 40 generates the allocate control signal CON that assigns the "non-write allocate system". As a result, a load on the main memory 30 is reduced. Also, unnecessary line replace is not performed, and therefore a subsequent cache hit rate is expected to be improved.

The third pattern P3 is a pattern other than the first pattern P1 and the second pattern P2. That is, in a case of the third pattern P3, two or three store requests to one block are generated. It is assumed that the cache memory 20 operates in the write allocate system. If the cache miss occurs upon the first 8-byte write, 32-byte block data including a corresponding 8-byte data is loaded in a corresponding line of the cache memory 20. Then, the 8-byte data is written in the line. Upon the subsequent second (or third) 8-byte write, the cache hit is guaranteed. This contributes to the speed-up of the vector store operation. Further, a part of the 32-byte block data first loaded in the cache memory 20 by the write allocate system remains without being rewritten. That is, the first load of the 32-byte block data is not meaningless, and therefore a subsequent cache hit rate is expected to be improved. Accordingly, in the case of the third pattern P3, the write allocate system is preferable. In the present exemplary embodiment, in the case of the third pattern P3, the write allocate determining section 40 generates the allocate control signal CON that assigns the "write allocate system".

Figure 6:
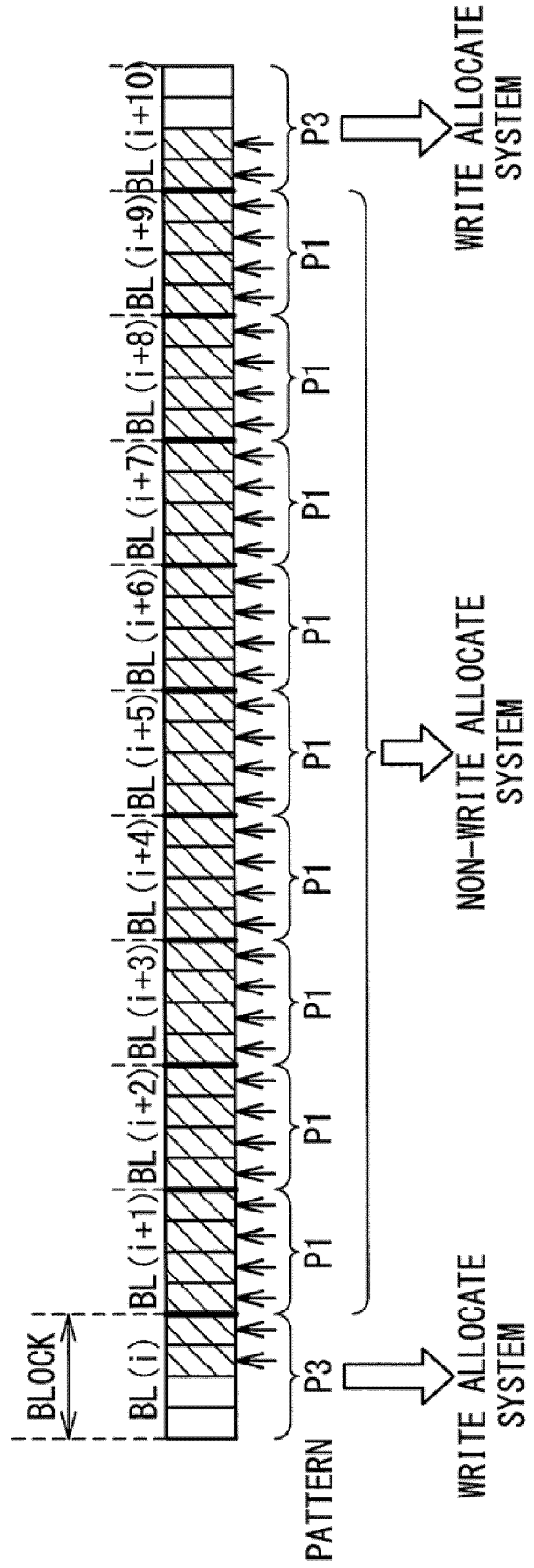
FIG. 6 conceptually illustrates an example of the vector store instruction.

FIG. 6 conceptually illustrates an example of the vector store instruction. In this example, a vector store instruction to 40 elements continuously located on the main memory 30 is issued. The vector store instruction includes store requests for the 40 elements, and an access target data unit is 8 bytes corresponding to a size of one vector element. That is, target addresses of the respective store requests are continuous. It should be noted that all of the target addresses (write pattern PAT) are identified upon issuance of the vector store instruction. The write pattern for the first block BL(i) is the above-described third pattern P3 in which two store requests are generated. Accordingly, the two store requests are assigned with the write allocate system. The write pattern for the subsequent blocks BL(i+1) to BL(i+9) is the above-described first pattern P1, and therefore the non-write allocate system is assigned. The write pattern for the final block BL(i+10) is again the third pattern P3, and therefore the write allocate system is assigned.

Figure 7:
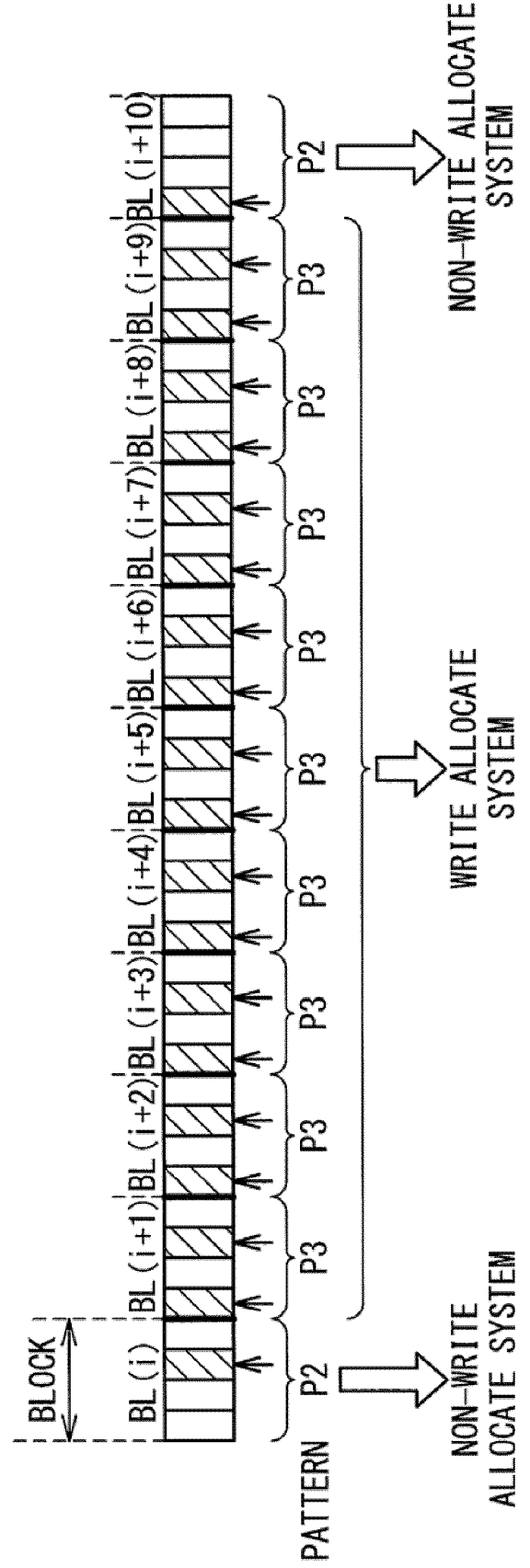
FIG. 7 conceptually illustrates another example of the vector store instruction.

FIG. 7 conceptually illustrates another example of the vector store instruction. In this example, a vector store instruction to 20 elements discretely located on the main memory 30 is issued. The vector store instruction includes store requests for the 20 elements, and an access target data unit is 16 bytes corresponding to a total size of two vector elements. That is, a target address of each of the store requests varies every 16 bytes in a skipping manner. It should be noted that all of the target addresses (write pattern PAT) are identified upon issuance of the vector store instruction. The write pattern for the first block BL(i) is the above-described second pattern P2 in which a store request is generated only once. Accordingly, the one store request is assigned with the non-write allocate system. The write pattern for the subsequent blocks BL(i+1) to BL(i+9) is the above-described third pattern P3, and therefore the write allocate system is assigned. The write pattern for the final block BL(i+10) is again the second block P2, and therefore the non-write allocate system is assigned.

As described above, according to the present exemplary embodiment, the write pattern PAT of the vector store instruction is focused on. The write pattern PAT can be recognized upon issuance of the vector store instruction. Also, according to the write pattern PAT, the operation system of the cache memory 20 is dynamically switched between the write allocate system and the non-write allocate system. Specifically, for a store request having the first pattern P1 or the second pattern P2, the non-write allocate system is employed. As a result, an unnecessary write allocate is eliminated, and therefore a load on the main memory 30 in the lower hierarchical layer is reduced. Accordingly, a reduction in performance of the main memory 30 is prevented. Also, unnecessary line replace is not performed, and therefore a subsequent cache hit rate is expected to be improved. Thus, a system processing efficiency can be improved.

3. Cache Memory 20

Figure 8:
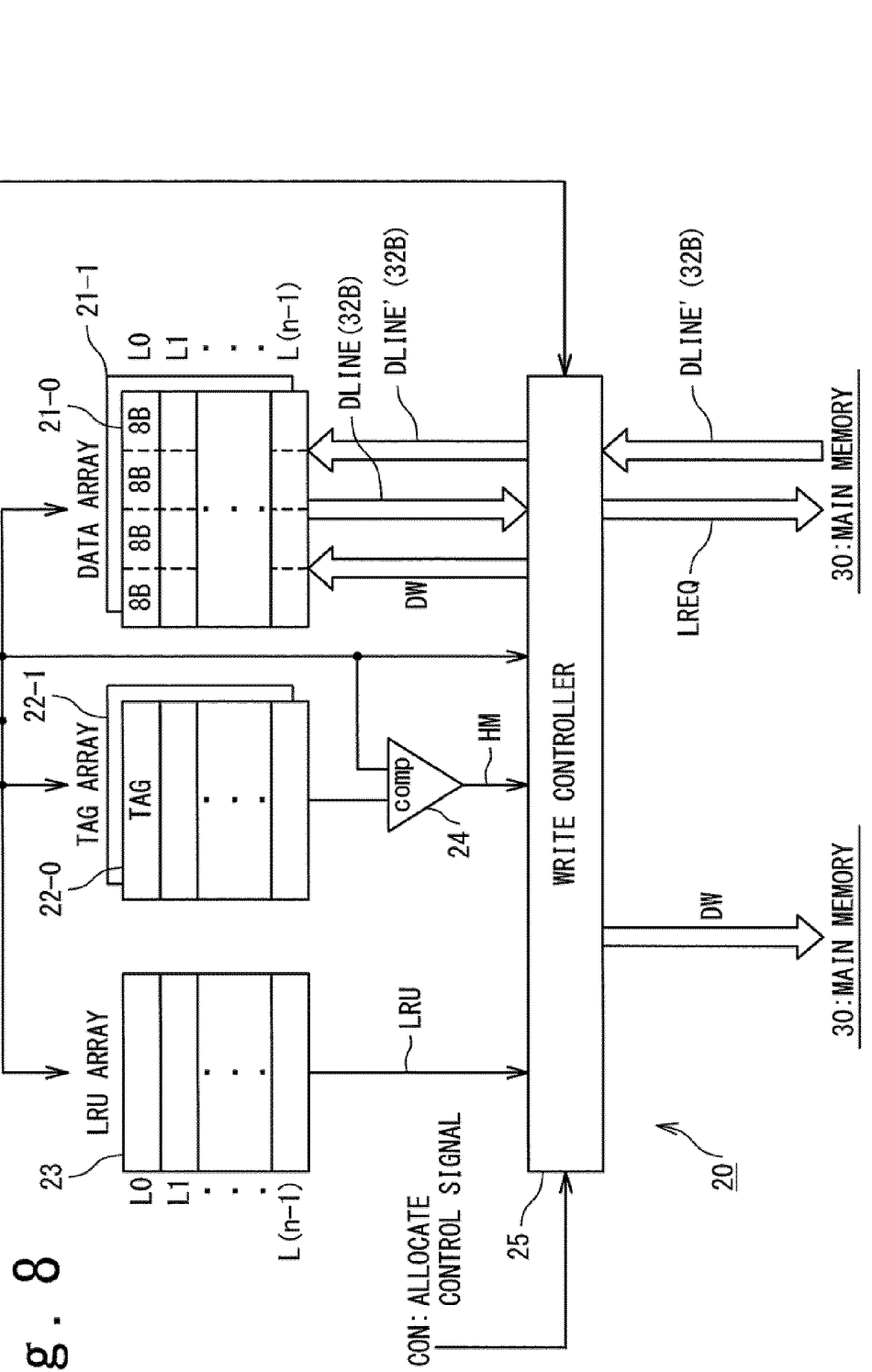
FIG. 8 is a block diagram illustrating an example of a basic configuration of the cache memory mounted in the vector computer system according to the present exemplary embodiment.

FIG. 8 illustrates an example of a basic configuration of the cache memory 20 mounted in the vector computer system 1 according to the present exemplary embodiment. As the example, it is assumed that the cache memory 20 is of the set associative system. The cache memory 20 has, in addition to the above-described data array 21, a tag array 22, an LRU array 23, a comparator 24, and a write controller 25.

As described above, the correspondence relationship between the respective lines of the cache memory 20 and the respective blocks of the main memory 30 is predetermined (see FIG. 3). Also, in each of the lines L0 to L(n−1) of the data array 21, data in a corresponding block is stored. Further, in a case of the set associative system, the data arrays 21 of which the number corresponds to the number of ways are provided. For example, in FIG. 8, two data arrays 21-0 and 21-1 having a same configuration are provided. In corresponding one line in different ways, block data in different frames related to the one line can be stored (see FIG. 3). For example, referring to FIG. 3, in the line L0 of the data array 21-0, data in the block BL00 of the frame FR0 can be stored, and in the line L0 of the data array 21-1, data in the block data BL10 of the different frame FR1 can be stored.

The tag array 22 indicates a frame for block data which has been stored in each of the lines of the data array 21. More specifically, the tag array 22 has entries, which respectively correspond to the lines L0 to L(n−1), and of which the number corresponds to the number of the lines. In each of the entries, "tag information" is stored. The tag information indicates a frame for data stored in a corresponding line, and typically includes an upper bit of an address of a corresponding block. Also, in the case of the set associative system, similarly to the data array 21, tag arrays 21 of the number corresponding to the number of ways are provided. For example, in FIG. 8, two tag arrays 22-0 and 22-1 having a same configuration are provided. In the respective tag arrays 22-0 and 22-1, pieces of tag information concerning the respective data arrays 21-0 and 21-1 are stored.

As described above, in corresponding one lines in different ways, block data in different frames related to the one lines can be stored. For example, it is assumed that in the line L0 of the data array 21-0, data in the block BL00 of the frame FR0 is stored, and in the line L0 of the data array 21-1, data in the block BL10 of the different frame FR1 is stored (see FIG. 3). A case where block data that belongs to a further different frame and is assigned to a corresponding line L0 is newly stored in the cache memory 20 is assumed. In this case, the line replace is required, and a line L0 in any one of the ways should be cleared. A way to which the line L0 to be cleared belongs is determined according to a predetermined algorithm. For example, the line in the least recently used Way is cleared. Such a system is referred to as an "LRU (Least Recently Used) system". Information indicating the least recently used Way concerning the respective lines is hereinafter referred to as "LRU information LRU". It can be said that the LRU information LRU is a guideline indicating which Way should be cleared upon line replace.

A section indicating LRU information LRU on each of the lines L0 to L(n−1) of the cache memory 20 is the LRU array 23 shown in FIG. 8. More specifically, the LRU array 23 has entries, which respectively correspond to the lines L0 to L(n−1), and the number of which corresponds to the number of the lines. In each of the entries, LRU information LRU concerning a corresponding line is stored. Upon replace of a line, LRU information LRU on the line is referred to.

A case is assumed where write data DW is written to an address on the main memory 30. In this case, the cache memory 20 is supplied with the write data DW and an address signal ADD indicating a write address. From the address signal ADD, it is determined that a block related to which line is to be accessed. Accordingly, by using the address signal ADD, data on a corresponding line can be read. Specifically, the tag array 22 is referred to, and tag information on the corresponding line is read from each of the tag arrays 22-0 and 22-1. Also, the LRU array 23 is referred to, from which LRU information LRU on the corresponding line is read.

The comparator 24 compares tag information included in the address signal ADD and tag information read from each tag array 22. A case where a result of the comparison indicates matching means the cache hit. On the other hand, a case where the comparison result indicates mismatching means the cache miss. The comparator 24 outputs a hit/miss signal HM indicating the cache hit or the cache miss.

The write controller 25 receives the hit/miss signal HM, LRU information LRU, and write data DW. Further, according to the present exemplary embodiment, the write controller 25 receives the allocate control signal CON generated by the above-described write allocate determining section 40. Subsequent processes by the write controller 25 are different depending on the hit/miss signal HM and the allocate control signal CON.

Figure 9:
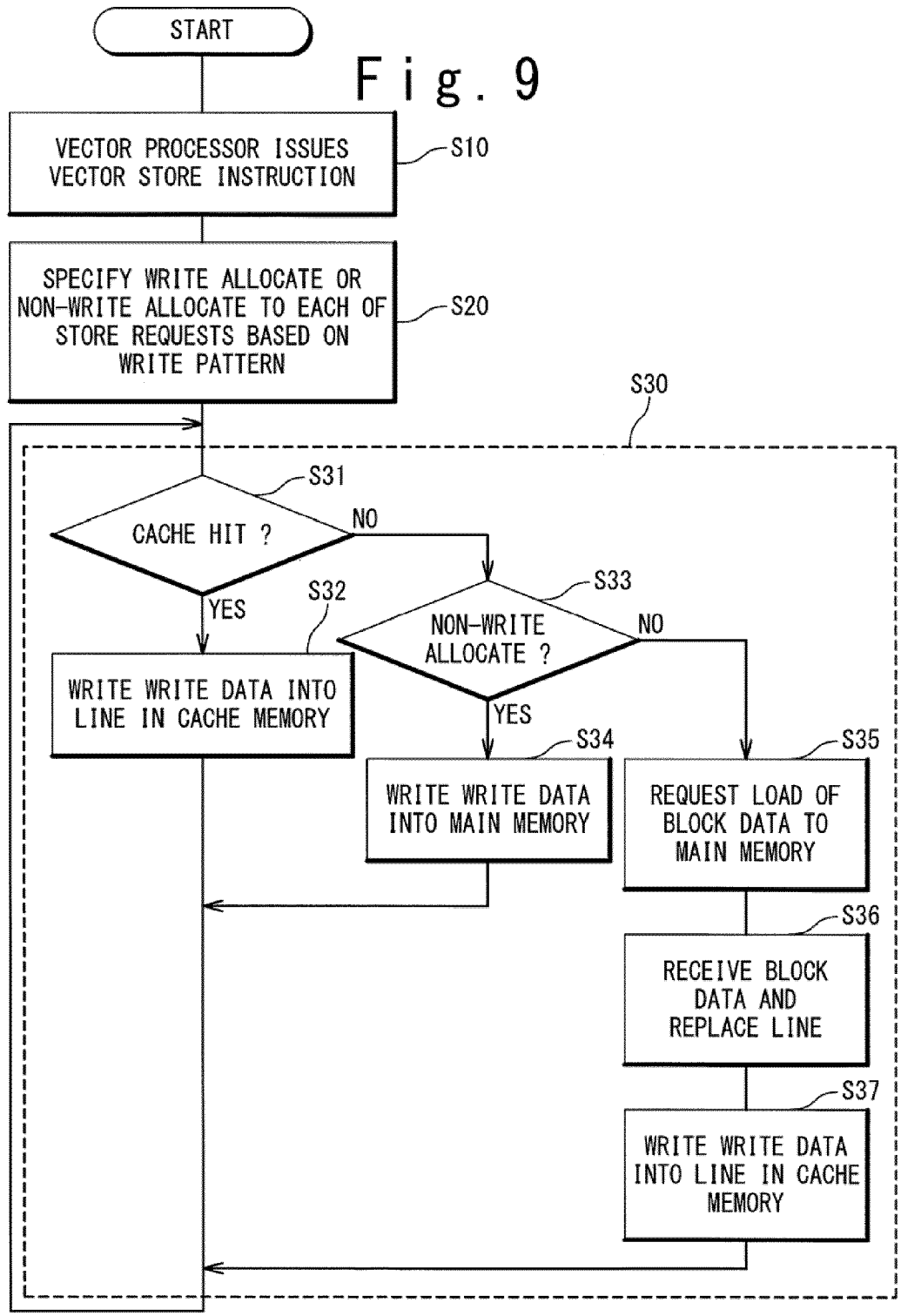
FIG. 9 is a flowchart illustrating an operation of the vector computer system according to the present exemplary embodiment.

FIG. 9 is a flowchart illustrating an operation of the vector computer 1 according to the present exemplary embodiment. First, the vector processor 10 issues a vector store instruction (Step S10). Then, the write allocate determining section 40 assigns the write allocate system or the non-write allocate system to each store request (Step S20). Specifically, the write allocate determining section 40 generates, on the basis of write pattern PAT of the vector store instruction, the above-described allocate control signal CON for each store request. Subsequently, the write allocate determining section 40 outputs the generated allocate control signal CON to the write controller 25. In the cache memory 20, the write controller 25 executes appropriate write processes depending on the hit/miss signal HM and the allocate control signal CON. (Step 30).

When the hit/miss signal HM indicates the cache hit (Step S31: Yes), the write controller 25 writes the write data DW into a corresponding line of the cache memory 20 (Step S32). This speeds up the write process.

In a case where the hit/miss signal HM indicates the cache miss (Step S31: No), the write controller 25 operates in any of the write allocate system and the non-write allocate system according to the allocate control signal CON. If the allocate control signal CON indicates the non-write allocate system (Step S33: Yes), the write controller 25 writes the write data DW in the main memory (Step S34).

On the other hand, when the allocate control signal CON indicates the write allocate system (Step S33: No), the write controller 25 performs the write allocate. Specifically, the write controller 25 issues to the main memory 30 a load request LREQ that requests a block including a write target address (Step S35). The main memory 30 reads corresponding block data DLINE' in response to the load request LREQ, and sends the read block data DLINE' to the write controller 25. The write controller 25 receives the block data DLINE', and uses the block data DLINE' to perform the line replace (Step S36). Specifically, the write controller 25 clears a corresponding line in Way indicated by LRU information LRU. At this time, the write controller 25 writes back the line data DLINE having originally stored in the line into the main memory 30 as necessary. Then, the write controller 25 writes the above block data DLINE' in the corresponding line as new line data. At this time, tag information and LRU information on the corresponding line are also updated. Subsequently, the write controller 25 writes the write data DW in the line (Step S37).

As described above, the write controller 25 switches between the write allocate system and the non-write allocate system according to the allocate control signal CON. As the write allocate determining section 40 that generates the allocate control signal CON, various configurations are possible as described below.

4. Write Allocate Determining Section 40

4-1. First Example

Figure 10:
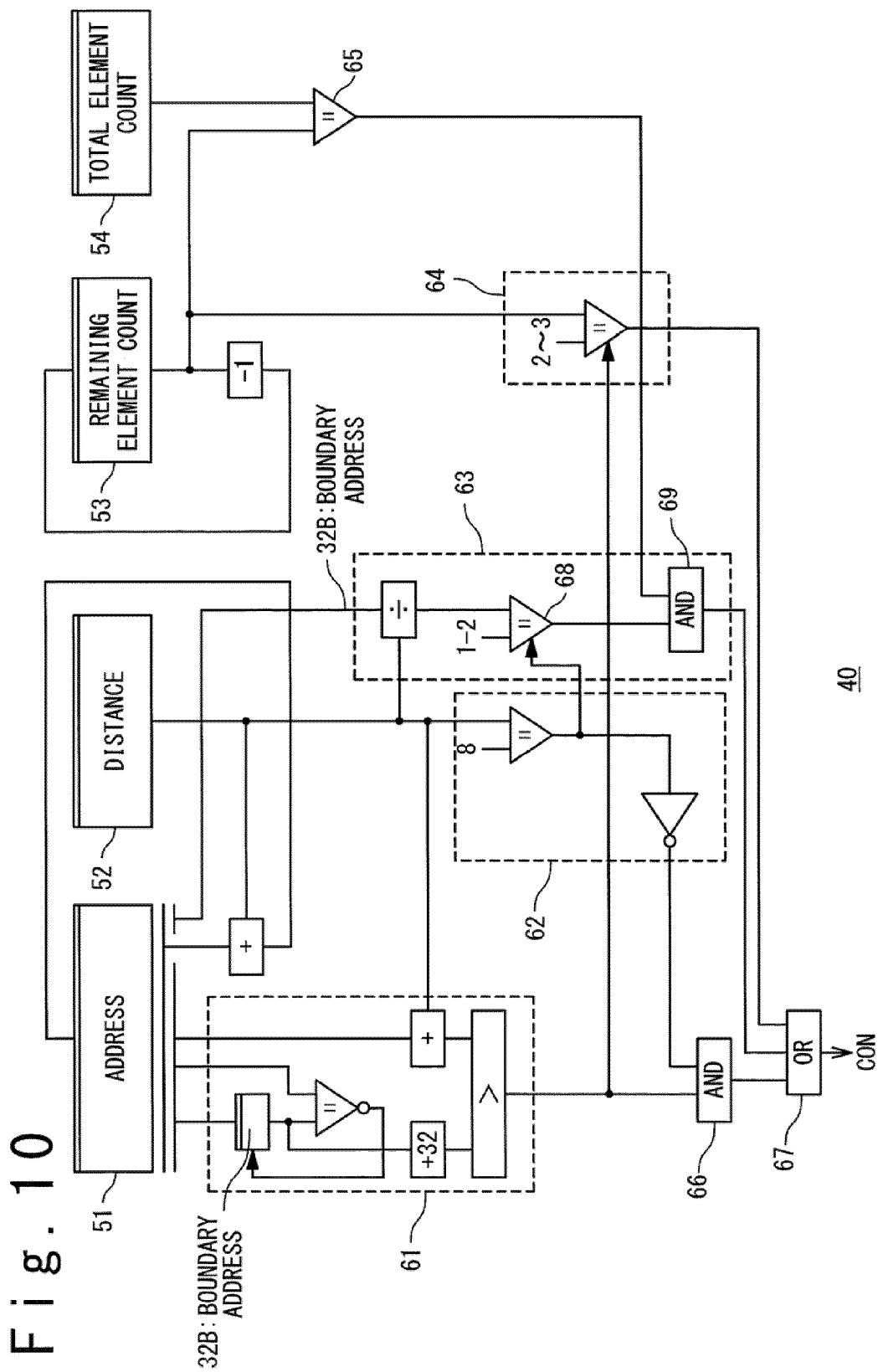
FIG. 10 is a block diagram illustrating a first example of a write allocate determining section according to the present exemplary embodiment.

FIG. 10 is a block diagram illustrating a first example of the write allocate determining section 40. In an address register 51, a target address is stored. The target address is updated in units of distances. In a distance register 52, the distance is stored. In a remaining element count register 53, the number of remaining store requests, i.e., the number of remaining write target elements is stored. In a total element count register 54, the total number of store requests included in a vector store instruction, i.e., the total number of write target elements is stored.

A block change determining section 61 determines, on the basis of a current target address and the distance, whether or not a next target address exceeds a block boundary. Specifically, a current block boundary address (32B boundary address) indicated by an upper bit of the current target address is retained by a register. By adding a block size (32 bytes) to the current block boundary address, a next block boundary address can be obtained. Also, by adding the distance to the current target address, the next target address can be obtained. The block change determining section 61 compares the next target address with the next block boundary address, and outputs a result of the comparison. In a case where the next target address is smaller than the next block boundary address, i.e., in a case where a write target block is the same for the next time, the block change determining section 61 outputs "1". On the other hand, in a case where the next target address is equal to or more than the next block boundary address, i.e., if the write target block changes for the next time, the block change determining section 61 outputs "0".

A distance determining section 62 determines whether or not the distance is for one element (8 bytes). That is, the distance determining section 62 determines whether the vector store instruction is continuous (see FIG. 6) or discrete (see FIG. 7). If the distance is 8 bytes, the distance determining section 62 outputs "0". In the other cases, the distance determining section 62 outputs "1".

An AND gate 66 receives outputs of the block change determining section 61 and the distance determining section 62. In a case where the write target block is the same for the next time, and the distance is not 8 bytes, an output of the AND gate 66 becomes "1". This case corresponds to, for example, the third pattern P3 illustrated in FIG. 7. The output of the AND gate 66 is "1", and therefore an output of an OR gate 67, i.e., the allocate control signal CON becomes "1". As described, in the case of the third pattern P3 illustrated in FIG. 7, the allocate control signal CON specifying the write allocate is outputted.

Also, in the case where the distance is 8 bytes, the third pattern P3 may be included, as illustrated in FIG. 6. Also, in the case of the third pattern P3 illustrated in FIG. 6, the output of the OR gate 67, i.e., the allocate control signal CON should be "1". However, in the case where the distance is 8 bytes, the distance determining section 62 outputs "0", and therefore the output of the AND gate 66 is also "0". To make the output of the OR gate 67 equal to "1", "1" should be inputted to the OR gate 67 from somewhere other than the AND gate 66. For this purpose, a start block determining section 63 and a final block determining section 64 are provided. In a case where the write pattern for the start block is the third pattern P3, the start block determining section 63 outputs 1". In the case where the write pattern for the final block is the third pattern P3, the final block determining section 64 outputs "1". As a result, even in the case of the third pattern P3 illustrated in FIG. 6, the output of the OR gate 67, i.e., the allocate control signal CON becomes "1".

More specifically, the start block determining section 63 divides a lower bit (address not more than 32B boundary address) of the target address by the distance. A comparator 68 detects that a quotient obtained by the division is 1 or 2. That is, the comparator 68 detects, for example, the third pattern P3 illustrated in FIG. 6. On the other hand, a comparator 65 compares the number of remaining elements stored in the remaining element count register 53 and the number of all elements stored in the total element count register 54. If the number of remaining elements is equal to the number of all elements, i.e., in a case of the start block, the comparator 65 outputs "1". The AND gate 69 receives outputs of the comparators 65 and 68. Then, if the third pattern P3 occurs in the start block, the AND gate 69 (start block determining section 63) outputs "1".

The final block determining section 64 receives the output of the above block change determining section 61, and the number of remaining elements stored in the remaining element count register 53. The case where the write target block is the same for the next time, and the number of remaining elements is 2 or 3 means that the third pattern P3 occurs in the final block. Accordingly, in this case, the final block determining section 64 outputs "1".

As described above, in the case of the third pattern P3, the output of the OR gate 67 is "1", and therefore the allocate control signal CON assigning the write allocate is outputted. In the other cases, the output of the OR gate 67 is "0", and therefore the allocate control signal CON assigning the non-write allocate is outputted. Thus, switching between the write allocate and the non-write allocate can be carried out according to the write pattern PAT. In this example, it can be said that the target address, distance, and number of elements clarified from the vector store instruction correspond to the write pattern PAT. The configuration illustrated in FIG. 10 is constructed in, for example, the vector processor 10.

4-2. Second Example

Figure 11:
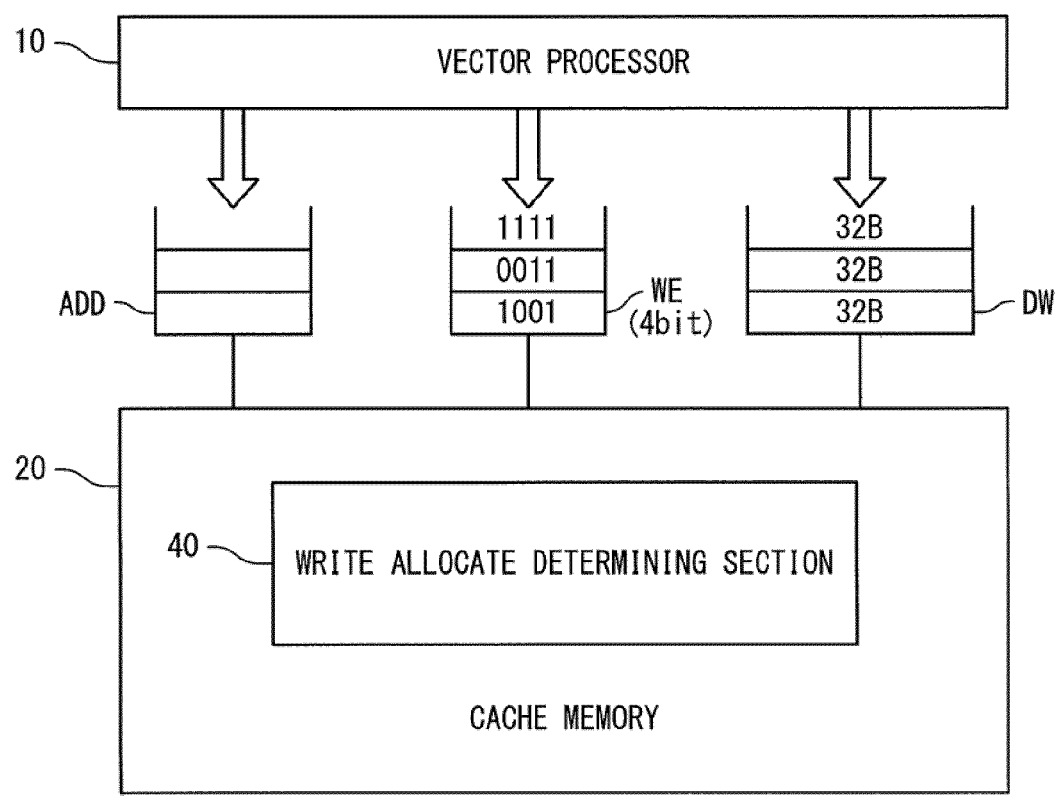
FIG. 11 is a block diagram illustrating an example of the vector computer system according to the present exemplary embodiment.

FIG. 11 schematically illustrates an example of the vector computer system 1. In The example of FIG. 11, data for one block (32 bytes) is transferred from the vector processor 10 to the cache memory 20. At this time, the vector processor 10 also outputs a write enable signal WE. The write enable signal WE is a 4-bit signal indicating whether or not each element included in the data for one block (32 bytes) is to be written. For example, in a case of WE="1001", first and last elements are to be written. Also, in a case of WE "1111", all elements are to be written. Thus, it can be said that the write enable signal WE corresponds to the above-described write pattern PAT. Accordingly, the write allocate determining section 40 receives the write enable signal WE as the write pattern PAT, and on the basis of the write enable signal WE, can generate the allocate control signal CON.

Figure 12:
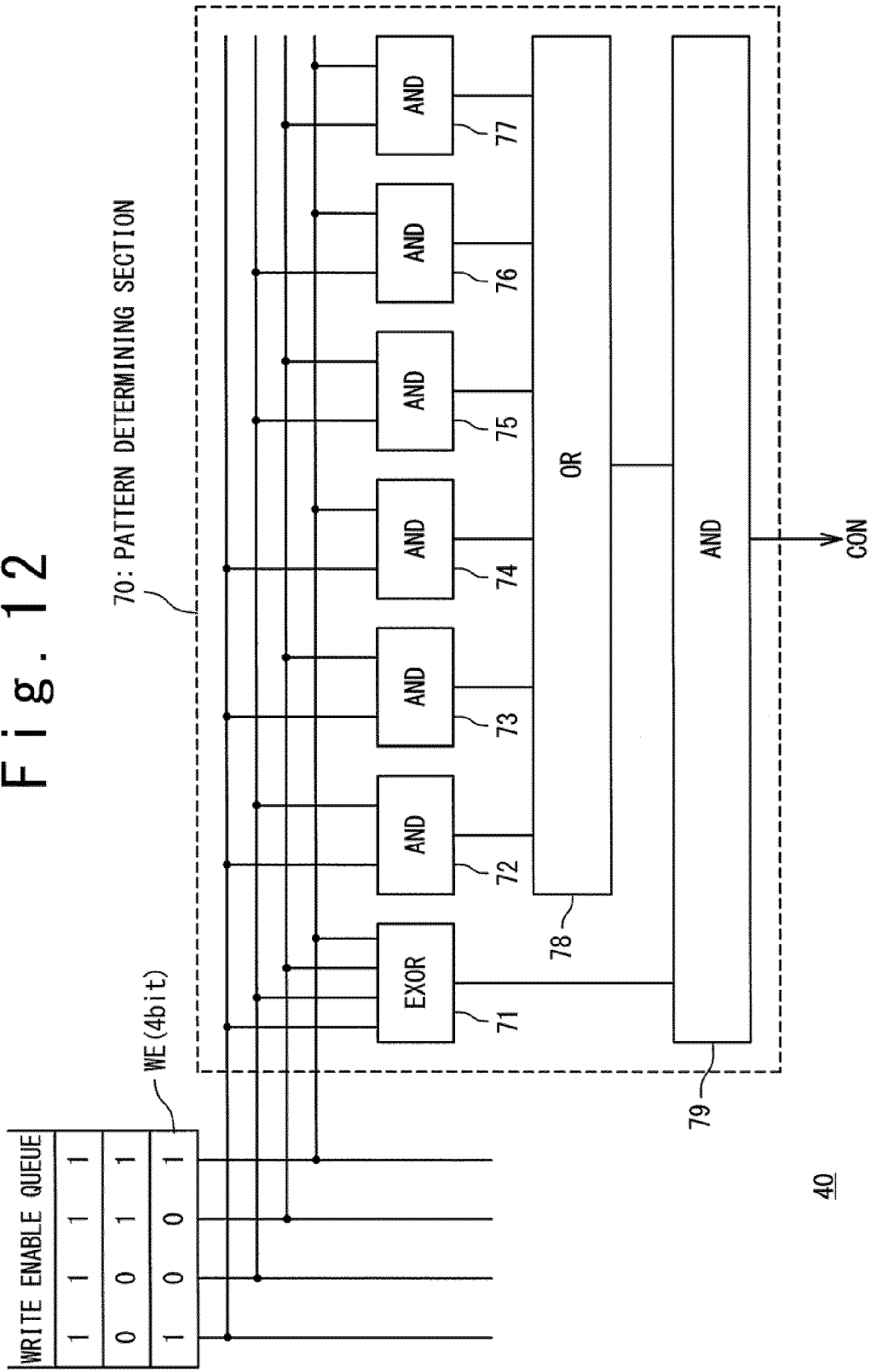
FIG. 12 is a diagram illustrating a second example of the write allocate determining section according to the present exemplary embodiment.

FIG. 12 illustrates a configuration of the write allocate determining section 40 in this example. The write allocate determining section 40 has a pattern determining section 70. The pattern determining section 70 receives the write enable signal WE from a write enable queue. Then, the pattern determining section 70 determines whether the write enable signal WE corresponds to the above-described first pattern P1, second pattern P2, or third pattern P3, and outputs the allocate control signal CON depending on a result of the determination.

More specifically, the pattern determining section 70 includes an EXOR gate 71, AND gates 72 to 77, an OR gate 78, and an AND gate 79. In the case of WE="1111", an output of the EXOR gate 71 is "0", and in the other cases, it is "1". Also, in cases of WE="1000", "0100", "0010", and "0001", outputs of all of the AND gates 72 to 77 are "0", and in the other cases, at least one of the outputs of the AND gates 72 to 77 is "1". Accordingly, in the cases of WE="1000", "0100", "0010", and "0001", an output of the OR gate 78 is "0", and in the other cases, it is "1". As a result, in cases of WE="1111", "1000", "0100", "0010", and "0001", an output of the AND gate 79 becomes "0", and in the other cases, it becomes "1". That is, in the case of the first pattern P1 or the second pattern P2, the allocate control signal CON is "0", and in the case of the third pattern P3, the allocate control signal CON is "1". Thus, switching between the write allocate and the non-write allocate can be carried out according to the write pattern PAT (write enable signal WE).

4-3. Third Example

Figure 13:
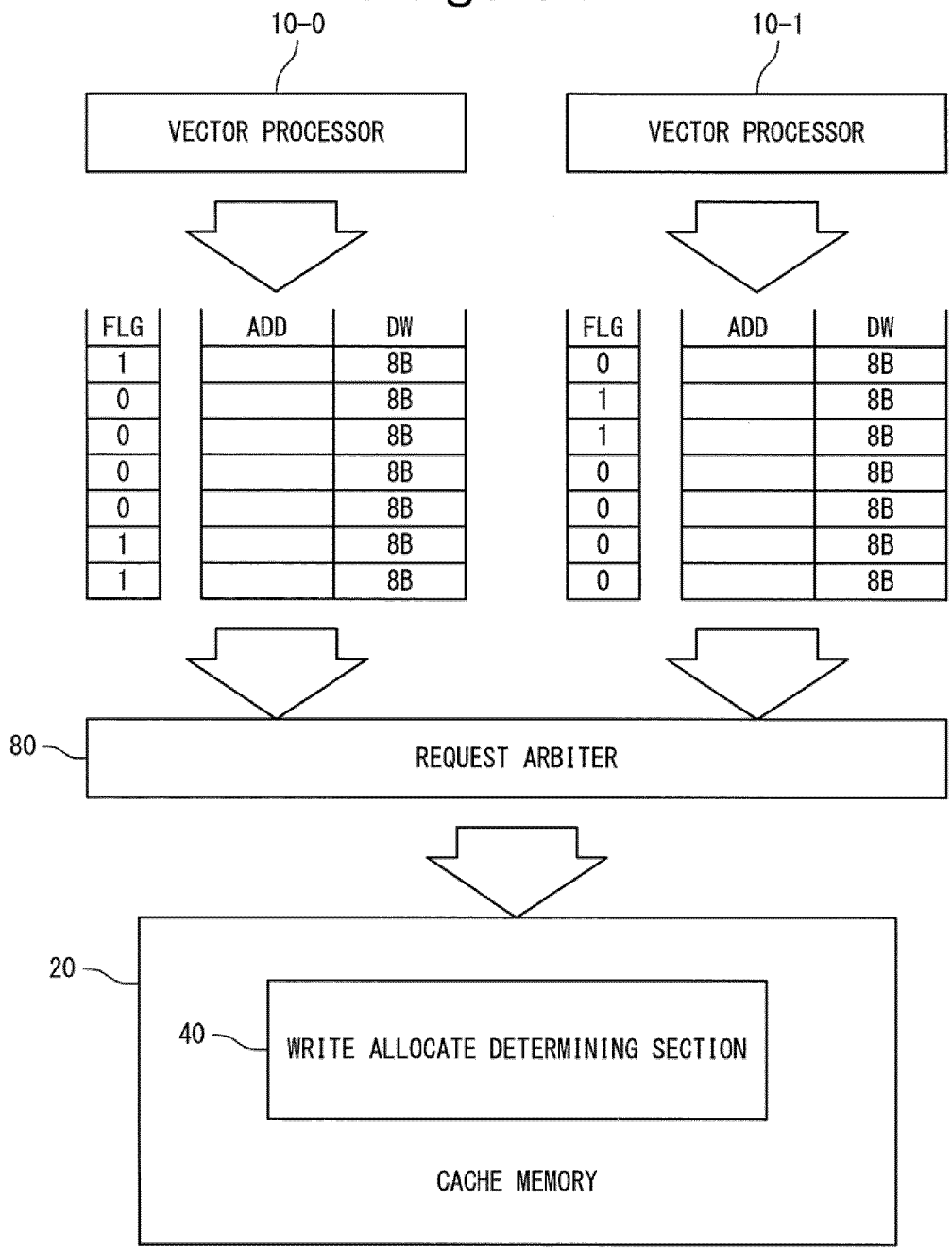
FIG. 13 is a block diagram illustrating another example of the vector computer system for a case of a multi-core design according to the present exemplary embodiment.

FIG. 13 schematically illustrates the vector computer system 1 for a case of a multi-core design. In this case, the cache memory 20 is shared by a plurality of vector processors 10. For example, in FIG. 13, the cache memory 20 is shared by vector processors 10-0 and 10-1. In this case, it may be impossible in terms of packaging to provide a data pass having a large transfer bandwidth as in the above-described second example.

For this reason, each of the vector processors 10 outputs a "same block flag FLG" indicating a store request to the same block. The same block flag FLG is set to a same value for the store request to the same block, and reversed every time a target block changes. That is, the same block flag FLG is reversed (toggled) for each block. For example, in a case where a sequence of the same block flags FLG is "11000011", the first and second indicate store requests to the same block, the third to sixth indicate store requests to a next same block, and the seventh and eighth indicate store requests to the further next same block. A request arbiter 80 refers to a same block flag FLG to continuously arbitrate store requests while the same block flag FLG indicates the same value.

In this example, the same block flags FLG associated with the plurality of store requests correspond to the above-described write pattern PAT. Accordingly, the write allocate determining section 40 receives the same block flags FLG as the write pattern PAT, and based on the basis of the same block flags FLG, can generate the allocate control signal CON. That is, the write allocate determining section 40 determines whether the sequence of the same block flags FLG corresponds to the above-described first pattern P1, second pattern P2, or third pattern P3, and outputs the allocate control signal CON according to a result of the determination.

Figure 14:
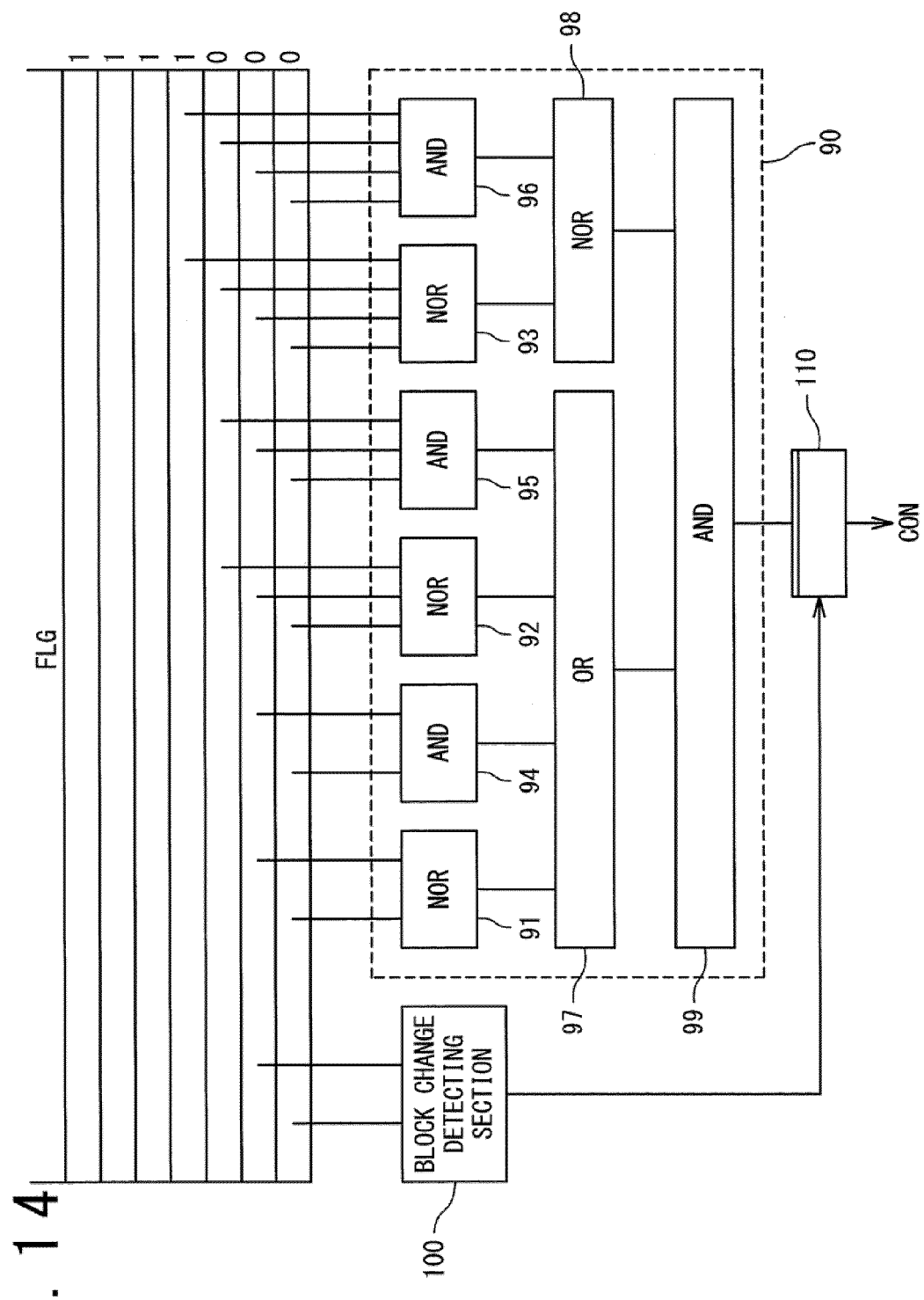
FIG. 14 is a block diagram illustrating a third example of the write allocate determining section according to the present exemplary embodiment.

FIG. 14 illustrates a configuration of the write allocate determining section 40 in this example. The write allocate determining section 40 has a pattern determining section 90, a block change detecting section 100, and a register 110.

The pattern determining section 90 determines, on the basis of a plurality of latest same block flags FLG, how many times a store request to the same block continues. That is, the pattern determining section 90 determines whether a sequence of the latest same block flags FLG corresponds to the first, second, or third pattern P1 to P3. Specifically, as illustrated in FIG. 14, the pattern determining section 90 includes NOR gates 91 to 93, AND gates 94 to 96, an OR gate 97, a NOR gate 98, and an AND gate 99. The NOR gate 91 and the AND gate 94 detect states of the latest two block flags FLG. The NOR gate 92 and the AND gate 95 detects states of the latest three same block flags FLG. The NOR gate 93 and the AND gate 96 detect states of the latest four same block flags FLG. In a case where a store request to the same block continues two or three times, an output of the AND gate 99 is "1", and in the other cases, the output of the AND gate 99 is "0". That is, the pattern determining section 90 outputs "1" in the case of the third pattern P3, and "0" in the case of the first pattern P1 or the second pattern P2.

The block change detecting section 100 detects a change of a store request target block. If the latest two same block flags FLG are reversed (toggled) each other means the change of a target block. Accordingly, the block change detecting section 100 can detects the change of a target block on the basis of the latest two same block flags FLG. Upon detection of the change of the target block, the block change detecting section 100 outputs a reset signal to the register 110.

The register 110 receives output data of the pattern determining section 90, and retains the data until the reset signal is supplied. Then, the data retained in the register 100 is outputted as the allocate control signal CON. That is, in the case of the first pattern P1 or the second pattern P2, the allocate control signal CON is "0", and in the case of the third pattern P3, the allocate control signal CON is "1". Thus, switching between the write allocate and the non-write allocate can be made according to the write pattern PAT (write enable signal WE).

As described, the exemplary embodiments of the present invention have been described referring to the drawings. However, the present invention is not limited to the above-described exemplary embodiments, but may be appropriately modified without departing from the scope thereof by one skilled in the art.

What is claimed is:

1. A vector computer system comprising:
   a vector processor configured to issue a vector store instruction which includes a plurality of store requests;
   a cache memory of a write back system provided between said vector processor and a main memory; and
   a write allocate determining section configured to generate an allocation control signal which specifies whether said cache memory operates based on a write allocate system or a non-write allocate system,
   wherein when said vector processor issues said vector store instruction, said write allocate determining section generates said allocation control signal to each of said plurality of store requests based on a write pattern as a pattern of target addresses of said plurality of store requests, said cache memory executes each store request based on one of said write allocate system and said non-write allocate system which is specified based on said allocation control signal.

2. The vector computer system according to claim 1, wherein one block of said main memory corresponds to one line of said cache memory, said write pattern includes at least one of:

a first pattern that the store request is generated to each of data contained in a block of said main memory;

a second pattern that the store request is generated only once to the block of said main memory; and a third pattern other than said first pattern and said second pattern, in a case of said first pattern or said second pattern, said write allocate determining section generates said allocation control signal to specify said non-write allocate system, and in a case of said third pattern, said write allocate determining section generates said allocation control signal to specify said write allocate system.

3. The vector computer system according to claim 2, wherein target data of said plurality of store requests is continuously positioned on said main memory, and said write pattern contains said first pattern at least.

4. The vector computer system according to claim 2, wherein the target data of said plurality of store requests is discretely positioned on said main memory, and said write pattern contains at least one of said second pattern and said third pattern.

5. The vector computer system according to claim 2, wherein said vector processor outputs a write enable signals which indicate whether or not each of elements contained in the data for the one block is a write target, as well as the data for the one block, said write allocate determining section receives the write enable signals as said write pattern, and determines which of said first pattern, said second pattern and said third pattern each of said write enable signals corresponds to.

6. The vector computer system according to claim 2, wherein said vector processor outputs a same block flag which is inverted for every block, to each of said plurality of store requests, said write allocate determining section receives said same block flags as said write pattern, and determines which of said first pattern, said second pattern and said third pattern each of said same block flags corresponds to.

7. A cache memory of a write back system for a vector processor, comprising:

a write allocate determining section configured to generate an allocation control signal which specifies whether said cache memory operates based on a write allocate system or a non-write allocate system; and a writing controller configured to execute a process of each of a plurality of store requests based on one of said write allocate system and said non-write allocate system which is specified by said allocation control signal, wherein when said vector processor issues said vector store instruction which includes said plurality of store requests, said write allocate determining section generates said allocation control signal to each of said plurality of store requests based on a write pattern as a pattern of target addresses of said plurality of store requests.

8. The cache memory according to claim 7, wherein one block of said main memory corresponds to one line of said cache memory, said write pattern includes at least one of:

a first pattern that the store request is generated to each of data contained in a block of said main memory;

a second pattern that the store request is generated only once to the block of said main memory; and a third pattern other than said first pattern and said second pattern, in a case of said first pattern or said second pattern, said write allocate determining section generates said allocation control signal to specify said non-write allocate system, and in a case of said third pattern, said write allocate determining section generates said allocation control signal to specify said write allocate system.

9. An operation method of a vector computer system which comprising a vector processor and a cache memory of a write back system, comprising:

issuing a vector store instruction which contains a plurality of store requests;

specifying one of a write allocate system and a non-write allocate system as a system for each of said plurality of store requests to be executed based on a write pattern as a pattern of target addresses of said plurality of store requests; and executing said store request based on the specified one of said write allocate system and said non-write allocate system by said cache memory.

10. The operation method according to claim 9, wherein one block of said main memory corresponds to one line of said cache memory, said write pattern includes at least one of:

a first pattern that the store request is generated to each of data contained in a block of said main memory;

a second pattern that the store request is generated only once to the block of said main memory; and a third pattern other than said first pattern and said second pattern, in a case of said first pattern or said second pattern, said non-write allocate system is specified, and in a case of said third pattern, said write allocate system is specified.

\* \* \* \* \*